United States Patent Office 3,527,789
Patented Sept. 8, 1970

3,527,789
PRODUCTION OF POLY(LOWER)ALKYL ALKENEPOLYCARBOXYLATES
George B. Payne, Berkeley, Calif., assignor to Shell Oil Company, New York, N.Y., a corporation of Delaware
No Drawing. Filed Oct. 6, 1967, Ser. No. 673,271
Int. Cl. C07c 69/52
U.S. Cl. 260—485                                    6 Claims

ABSTRACT OF THE DISCLOSURE

Production of acyclic alkene derivatives having a plurality of alkoxycarbonyl groups as chain substituents by reacting certain stabilized sulfur ylids with certain $\alpha,\beta$-unsaturated aliphatic esters in the liquid phase in a reaction medium of a lower aliphatic alcohol of 1 to 4 carbon atoms. The poly(lower)alkyl alkenepolycarboxylates thereby produced are hydrolyzed to obtain the corresponding alkenepolycarboxylic acids which are useful epoxy curing agents.

BACKGROUND OF THE INVENTION

In applicant's copending application U.S. Ser. No. 551,212, filed May 19, 1966, now U.S. Pat. No. 3,397,223, is described a process for producing cyclopropane derivatives having a plurality of electron-withdrawing groups as ring substituents, e.g., 1,2,3-tris(carbethoxy)cyclopropane, by reacting, in the liquid phase in the presence or absence of reaction solvents, stabilized sulfur ylids with olefins in which an ethylenic carbon-carbon double bond is activated by conjugation with an unsaturated moiety of an electron-withdrawing substituent.

SUMMARY OF THE INVENTION

Surprisingly it has now been found that, when certain stabilized sulfur ylids are reacted with certain $\alpha,\beta$-unsaturated aliphatic esters in the liquid phase in the presence of a lower alkanol of 1 to 4 carbon atoms, acyclic derivatives, which are poly(lower)alkyl alkenepolycarboxylates of 2 to 4 carboxylic groups, are produced rather than the expected cyclopropane derivatives.

DESCRIPTION OF PREFERRED EMBODIMENTS

The sulfur ylid reactant comprises a molecule incorporating a moiety represented by the following resonance form:

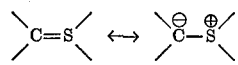

The class of sulfur ylids to be employed as reactants in the process of the invention comprises ylids of up to 14 carbon atoms represented by the formula

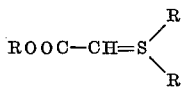

wherein R independently is lower alkyl, e.g., alkyl of up to 4 carbon atoms such as methyl, ethyl, propyl or butyl. It should be appreciated that the ylid molecule is the hybrid of several resonance structures involving polarization of the carbon-sulfur double bond and possible delocalization of any negative charge on the carbon atom by the neighboring alkoxycarbonyl (ROOC—) group, and that as a result no single structure adequately describes the ylid molecule. For convenience, however, the ylid is described in terms of the above formula which represents one contributing structure.

A variety of systems of nomenclature are applicable to the naming of the ylid reactants of the invention.

As employed herein, the term "dialkylthioxo" is descriptive of the =SRR moiety. Thus, representative ylids include methyl (dipropylthioxo)acetate, ethyl (dimethylthioxo)acetate, propyl (diethylthioxo)acetate, butyl (dimethylthioxo)acetate and the like. Particularly useful is the ylid of the above formula wherein each R attached to the sulfur atom is methyl and the remaining R, attached to an oxygen atom, is ethyl.

The ylid reactants are most easily prepared by dehydrohalogenation of the corresponding sulfonium halide. For example, dehydrohalogenation of ethoxycarbonylmethyldimethylsulfonium bromide results in the production of ethyl (dimethylthioxo)acetate. One method of effecting dehydrohalogenation of the sulfonium halide precursor of the ylid reactant comprises reacting the sulfonium halide with alkali metal or alkali metal hydride under anhydrous conditions according to the method of A. J. Speziale et al., J. Am. Chem. Soc., 87, 3462 (1965). A more suitable method of effecting the dehydrohalogenation comprises reacting the sulfonium halide with an essentially saturated aqueous solution of alkali metal carbonate containing at least a stoichiometric amount of alkali metal hydroxide. This procedure is described more fully and is claimed in applicant's copending application U.S. Ser. No. 551,233, filed May 19, 1966.

The class of $\alpha,\beta$-unsaturated aliphatic esters to be employed as reactants in the process of the invention comprises esters of up to 12 carbon atoms represented by the formula $$R''\text{—CH=CH—COOR'}$$

wherein R'' is hydrogen, methyl or —COOR' and R' is lower alkyl, e.g., alkyl of up to 4 carbon atoms such as methyl, ethyl, propyl or butyl. Thus, representative $\alpha,\beta$-unsaturated esters include methyl acrylate, ethyl acrylate, propyl acrylate, butyl acrylate, methyl crotonate, ethyl crotonate, diethyl fumarate, dipropyl fumarate, dimethyl maleate, dibutyl maleate and the like.

Molar ratios of the sulfur ylid to the $\alpha,\beta$-unsaturated ester reactant of from about 5:1 to about 1:20 are satisfactory. It is generally desirable to provide an amount of $\alpha,\beta$-unsaturated ester reactant that is at least stoichiometric and molar ratios of sulfur ylid to $\alpha,\beta$-unsaturated ester reactant of from about 1:1 to about 1:5 are preferred.

The sulfur ylid and the $\alpha,\beta$-unsaturated ester reactant are contacted in the liquid phase in the presence of a lower alkanol of 1 to 4 carbon atoms as reaction solvent. The aliphatic alcohols which are suitable reaction solvents in the process of the invention are capable of dissolving both reactants, are liquid at the reaction temperature and pressure employed and are critical to the formation of the acyclic unsaturated product insofar as in the absence of these alcohols, i.e., in the presence of no solvent or solvents other than these alcohols, the product obtained is a cyclopropane derivative. Just precisely how the alcohols direct the process is not known; however, they do take part additionally in normal ester interchange. Preferably the "alkyl" portion of the alkanol will correspond to the R of the ROOC— moiety of the sulfur ylid and to the R' of the R'OOC— moiety of the $\alpha,\beta$-unsaturated ester. However, if this correspondence is not present, ester interchange will produce in the product mixed esters. Such is of no great consequence, particularly when it is desired to convert the product esters to the corresponding acids by hydrolysis. Thus, the reaction solvents required in the process of the invention include methanol, ethanol, 1-propanol, 2-propanol, 1-butanol, 2-butanol, isobutyl alcohol, tert-butyl alcohol and mixtures thereof. The alcohol should be present at least in an amount sufficient to function as solvent for the $\alpha,\beta$-unsaturated ester reactant. Thus, it is generally preferred to employ an amount of alcohol at least equal in weight to that of the α,β-unsaturated ester reactant present. Although there is no upper limit on the quantity of alcohol solvent that is useful, from a practical standpoint, it is preferred to employ an amount by weight of solvent up to ten times the weight amount of α,β-unsaturated ester reactant.

The method of providing contact between the ylid and α,β-unsaturated ester reactants is not material and one reactant may be added gradually to the other as by a slow addition of the ylid to the α,β-unsaturated ester reactant, although it is equivalently useful to mix initially the entire amounts of reactants. The reaction of the ylid and α,β-unsaturated ester reactants is conducted at moderate temperatures, and reaction temperatures from about 0° C. to about 150° C. are satisfactory. Preferred, however, are reaction temperatures from about 25° C. to about 85° C. The reaction is conducted at any convenient pressure, provided that the reaction mixture is maintained substantially in the liquid phase. Largely for reasons of convenience, the use of a substantially atmospheric pressure, e.g., from about 0.5 atmosphere to about 10 atmospheres, is preferred. Subsequent to reaction, the product mixture is separated and the desired poly(lower)alkyl alkenepolycarboxylate is recovered by conventional methods, e.g., fractional distillation, selective extraction, fractional crystallization or the like.

The poly(lower)alkyl alkenepolycarboxylates of 2 to 4 carboxylic groups produced by the process of the invention are full esters, i.e., each carboxylic group is esterified. They may be described as (lower)alkyl esters (full) of ($C_3$–$C_7$ alkene)polycarboxylic acids wherein poly signifies di, tri or tetra. The poly($C_2$–$C_4$ alkyl) ($C_3$–$C_7$ alkene)-polycarboxylates of 2 to 4 carboxylic groups are produced by reaction of the sulfur ylid and the α,β-unsaturated ester reactant in a 1:1–3 molecular ratio. Although it is not desired to be bound by any particular theory, it is believed probable that a polarized form of the ylid adds to the activated carbon-carbon double bond of the α,β-unsaturated ester reactant to form a nonisolable dipolar intermediate which eliminates dialkyl sulfide and effects charge neutralization by formation of unsaturation in the "alkene" portion of the poly(lower)alkyl alkenepolycarboxylate. Thus, for example, ethyl (dimethylthioxo)acetate reacts with diethyl fumarate or diethyl maleate to produce triethyl aconitate

[$EtO_2CCH=C(CO_2Et)CH_2CO_2Et$]

and methyl sulfide; similarly ethyl (dimethylthioxo)acetate reacts with ethyl crotonate to produce diethyl 3-methylglutaconate [$EtO_2CCH=C(CH_3)CH_2CO_2Et$] and methyl sulfide. More than one poly(lower)alkyl ($C_3$–$C_7$ alkene)polycarboxylate may be formed in the product mixture when the sulfur ylid reacts with more than one molecule of α,β-unsaturated ester reactant; for example, ethyl (dimethylthioxo)acetate reacts with ethyl acrylate to produce triethyl 2-pentene-1,3,5-tricarboxylate

[$EtO_2CCH_2CH_2C(CO_2Et)=CHCH_2CO_2Et$]

triethyl 3-(2-ethoxycarbonylethyl)-1-pentene-1,3,5-tricarboxylate [$EtO_2CCH=CHC(CO_2Et)(CH_2CH_2CO_2Et)_2$] and methyl sulfide.

The poly(lower)alkyl alkenepolycarboxylate products of the invention are useful in a variety of applications. They may be hydrogenated to produce the corresponding saturated alkanepolycarboxylates, e.g., tri-n-butyl carballylate or triethyl 3-(2-carboxyethyl)-pentane-1,3,5-tricarboxylate, which are plasticizers, for example for polyvinyl chloride, in the preparation of polymeric compositions, protective coatings, adhesives and similar substances. Hydrolysis of the alkenepolycarboxylates of the invention produces alkenepolycarboxylic acids, e.g., 2-pentene-1,3,5-tricarboxylic acid, which are useful as epoxy curing agents in the preparation of epoxy resins. Hydrolysis of the saturated esters mentioned hereinabove produces alkane-polycarboxylic acids, e.g., pentane-1,3,5-tricarboxylic acid or 3-methylglutaric acid, which upon reaction with polyols such as glycerol produce thermosetting compounds, e.g., alkyd resins.

EXAMPLE 1

To a solution of 20.0 g. (0.20 mole) of ethyl acrylate in 50 ml. of absolute ethanol was added a solution of 7.4 g. (0.05 mole) of ethyl (dimethyldithioxo)acetate in 25 ml. of ethanol. Ice cooling was needed to hold the temperature of the exothermic reaction at 30–35° C. After an overnight stand at 25° C., the mixture was flashed into a Dry Ice-cooled trap at 5 mm. and 25° C. Glpc (gas-liquid partition chromatographic) analysis of the volatiles indicated that they contained 3.0 g. (0.048 mole) of methyl sulfide and 8.0 (0.080 mole) of ethyl acrylate. Distillation of the residue gave 9.8 g. (69% yield) of triethyl 2-pentene-1,3,5-tricarboxylate, B.P. 106–109° C. (<1 mm.), $n^{25}{}_D$ 1.4553, and 4.1 of residue A.

Analysis.—Calcd. for $C_{14}H_{22}O_6$ (percent): C, 58.7; H, 7.7. Found (percent): C, 58.7; H, 7.8.

Distillation of residue A gave material with B.P. 170–175° C. (<1 mm.) in good recovery. It was shown by infrared analysis to be identical with triethyl 3-(2-ethoxycarbonylethyl)-1-pentene-1,3,5-tricarboxylate prepared by independent synthesis. The yield of residue A was 21%, calculated as tetraester $C_{19}H_{30}O_8$.

A solution of 8.0 g. (0.028 mole) of the above prepared triethyl 2-pentene-1,3,5-tricarboxylate in 50 ml. of concentrated hydrochloric acid was warmed on the steam bath for four hours and then allowed to stand overnight. Filtration of the resulting precipitate gave 3.4 g., M.P. 181–182° C.; concentration of the filtrate followed by recrystallization from acetone gave another 0.5 g., M.P. 178–180° C. (70% combined yield). Recrystallization of the two crops gave 2-pentene-1,3,5-tricarboxylic acid with M.P. 181–182° C.

Analysis.—Calcd. for $C_8H_{10}O_6$ (percent): C, 47.5; H, 5.0. Found (percent): C, 47.8; H, 5.1.

Hydrogenation of the above prepared unsaturated acid was carried out in a Parr hydrogenator using 5% palladium on carbon catalyst, ethyl alcohol as solvent, and a pressure of 40 p.s.i. One molar equivalent of hydrogen was absorbed in 0.5 hour to give 1,3,5-pentanetricarboxylic acid, M.P. 112–114° C. A mixed M.P. with an authentic sample (M.P. 113–115° C.) was not depressed. The infrared spectra were identical.

EXAMPLE 2

A mixture of 11.4 g. (0.10 mole) of ethyl crotonate, 7.4 g. (0.05 mole) of ethyl (dimethylthioxo)acetate and 50 ml. of ethanol was held at room temperature for four days and then heated under reflux for one hour. Claisen distillation gave 7.5 g. (75% yield) of diethyl 3-methylglutaconate, B.P. 65–66° C. (<1 mm.), $n^{25}{}_D$ 1.4488.

Analysis.—Calcd. for $C_{10}H_{16}O_4$ (percent): C, 60.0; H, 8.1. Found (percent): C, 59.9, H, 8.1. Nmr analysis indicated an approximately 1:1 mixture of cis and trans isomers.

Saponification of the diester product by aqueous ethanolic sodium hydroxide gave an 86% yield of 3-methylglutaconic acid.

Analysis.—Calcd. for $C_6H_8O_4$ (percent): C, 50.0; H, 5.6; neut. equiv., 72. Found (percent): C, 50.3; H, 5.7; neut. equiv., 72.

EXAMPLE 3

The reaction was carried out as described in Example 2 using 34.4 g. (0.20 mole) of diethyl fumarate and 14.8 g. (0.10 mole) of ethyl (dimethylthioxo)acetate in 75 ml. of ethanol. After 18 hours the mixture was Claisened to give 17.1 g. (0.10 mole) of recovered diethyl fumarate and 22.5 g. (87% yield) of triethyl aconitate, B.P. 97–99° C. (<1 mm.), $n^{25}{}_D$ 1.4515.

I claim as my invention:

1. The process of producing a poly(lower)alkyl alkenepolycarboxylate of 2 to 4 carboxylic groups by intimately contacting (a) the sulfur ylid of up to 14 carbon atoms of the formula

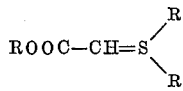

wherein R independently is lower alkyl, and (b) the α,β-unsaturated aliphatic ester of up to 12 carbon atoms of the formula

wherein R″ is hydrogen, methyl or —COOR′ and R′ is lower alkyl in the liquid phase in the presence of a quantity of a lower alkanol of 1 to 4 carbon atoms at least equal in weight to that of said α,β-unsaturated ester at a temperature from about 0° C. to about 150° C.

2. The process of claim 1 wherein the alkanol is ethanol and the temperature is from about 25° C. to about 85° C.

3. The process of claim 2 wherein each of R and R′ bonded to an oxygen atom is ethyl and each R bonded to a sulfur atom is methyl.

4. The process of claim 3 wherein the ylid is ethyl (dimethylthioxo)acetate and the α,β-unsaturated ester reactant is ethyl acrylate.

5. The process of claim 3 wherein the ylid is ethyl (dimethylthioxo)acetate and the α,β-unsaturated ester reactant is ethyl crotonate.

6. The process of claim 3 wherein the ylid is ethyl (dimethylthioxo)acetate and the α,β-unsaturated ester reactant is diethyl fumarate.

References Cited

Speziale et al.: J. Am. Chem. Soc., 87, 3460–62 (1965).

LORRAINE A. WEINBERGER, Primary Examiner

E. JANE SKELLY, Assistant Examiner

U.S. Cl. X.R.

260—537